United States Patent [19]

Madiot et al.

[11] Patent Number: 4,706,366
[45] Date of Patent: Nov. 17, 1987

[54] METHOD OF MANUFACTURING A DOUBLE-WALL CONTAINER INCLUDING A NEUTRON-ABSORBING SCREEN FOR TRANSPORTING AND STORING RADIO-ACTIVE MATERIAL

[75] Inventors: André Madiot, Soissons; Joël Kerjean, Saint Herblin, both of France

[73] Assignee: Establissements Lemer & Cie, Carquefou Cedex, France

[21] Appl. No.: 726,716

[22] Filed: Apr. 24, 1985

[30] Foreign Application Priority Data

Apr. 25, 1984 [FR] France .................................. 84 06498

[51] Int. Cl.[4] ........................ B21D 39/00; B21B 17/07
[52] U.S. Cl. ............................................. 29/523; 72/370
[58] Field of Search ........ 72/370; 29/455 R, 455 LM, 29/507, 508, 523

[56] References Cited

U.S. PATENT DOCUMENTS

| 3,156,042 | 11/1964 | Reed | 29/523 |
| 3,759,203 | 9/1973 | Frankenderg | 72/370 |
| 3,882,313 | 5/1972 | Siemens | 250/507 |
| 3,986,654 | 10/1976 | Hart et al. | 72/370 |
| 4,031,921 | 6/1977 | Maroni . | |
| 4,332,073 | 6/1982 | Yoshida et al. | 29/523 |
| 4,359,811 | 11/1982 | Monroe | 29/523 |
| 4,377,894 | 3/1983 | Yoshida | 29/523 |
| 4,387,498 | 6/1983 | Morhard | 29/455 LM |
| 4,399,366 | 8/1983 | Bucholz | 250/507.1 |

FOREIGN PATENT DOCUMENTS

| 2212820 | 7/1974 | France . |
| 820883 | 9/1959 | United Kingdom . |
| 1233574 | 5/1971 | United Kingdom . |

Primary Examiner—Howard N. Goldberg
Assistant Examiner—Steven Nichols
Attorney, Agent, or Firm—Thomas J. Greer, Jr.

[57] ABSTRACT

An inner tube (1) and an outer tube (6) are provided of suitable shape and size for the inner tube to be received coaxially inside the outer tube, thereby causing the outside face of the inner tube to face the inside face of the outer tube. A neutron-absorbing screen (2) is fixed to one of said faces. The inner tube is inserted into the outer tube, and the inner tube is radially expanded into the outer tube while leaving the outer tube externally free to expand, and thereby plastically deforming both tubes and obtaining a solid single block assembly of desired shape and size for the container. The container may be used for storing radioactive material.

12 Claims, 7 Drawing Figures

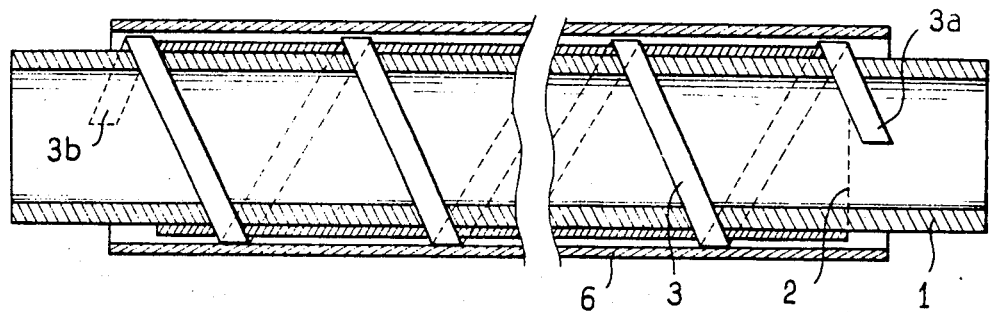
FIG_1
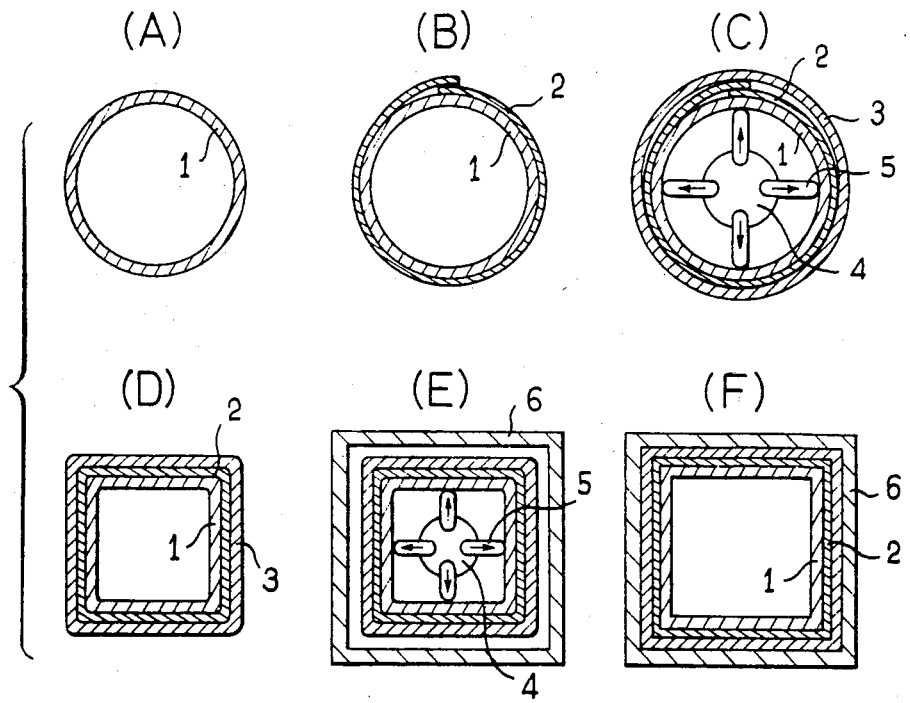
FIG_2

METHOD OF MANUFACTURING A DOUBLE-WALL CONTAINER INCLUDING A NEUTRON-ABSORBING SCREEN FOR TRANSPORTING AND STORING RADIO-ACTIVE MATERIAL

The present invention relates to a method of manufacturing a double-wall container including a neutron-absorbing screen for enclosing radioactive material.

BACKGROUND OF THE INVENTION

U.S. Pat. No. 3 119 933 describes a receptacle for transporting radioactive material and comprising a double wall containing screen material such as blocks of lead.

The manufacture of such a receptacle poses a problem with the insertion of the screen material between the other two walls. The insertion is even more difficult when the screen material is not in the form of relatively thick and rigid blocks, but is in the form of a thin sheet having poor mechanical qualities, as in the case for boron steel or for sheets of cadmium or cadmium alloy, for example.

Preferred embodiments of the present invention solve this problem and enable screen material to be used which is about 0.10 millimeters (mm) to 1 mm thick. The invention does not bear on a particular composition of screen material and is not limited to any such composition. Suitable screen materials include, for example, the neutron-absorbing materials described in Swiss Pat. No. 364 565 and in British Pat. No. 958 267, but it should be understood that the invention is in no way limited to these specific materials.

SUMMARY OF THE INVENTION

According to the invention, in order to manufacture a double-wall container including a thin neutron-absorbing screen between facing faces of two tubes of steel constituting the double walls, a method is implemented in which the two tubes are made so that one can be passed into the other, the said screen is fixed to one of said faces prior to passing one tube into the other, the said one tube is passed into the other, and the inner tube is expanded radially inside the outer tube which is unrestrained externally so as to obtain a tubular assembly by plastic deformation, said assembly having the desired shape and size and being rendered solid by said expansion.

Preferably the screen is placed on the inner tube, i.e. on the outside face of the inner tube, and is held there by any means suitable for obtaining or for ensuring that the screen stays in place while being inserted into the outer tube.

In another implementation, the screen is placed on the inside face of the outer tube, with or without shaping prior to inserting the inner tube into the outer tube.

Preferably, a local welding technique is used to fix the absorbing screen, or else a technique is used in which the screen is surrounded by a binding tape whose ends are fixed to the ends of the tube.

The absorbing screen is chosen to be 0.10 mm to 1 mm thick, and is preferably 0.4 mm to 0.9 mm thick, or better 0.5 mm to 0.8 mm thick.

It should be observed that the screen may be placed around an inner tube regardless of the section of said tube, and that the same is true of a binding tape for holding the screen on the inner tube.

In a preferred implementation, the assembly of the inner tube and the screen is shaped a first time to give said assembly a desired cross section prior to inserting the assembly into the outer tube, thereby enabling an outer tube to be selected with a cross section which is as close as possible to that of the inner tube, so that the final shaping operation on the inner tube avoids excessive deformation which would lead to residual stresses harmful to long-term stability of the container.

The inner tube may have any desired cross section, but it is preferably circular or square in cross section.

It should be observed that when a square section container is desired, it is possible to start with an inner tube of circular section and to shape it to be approximately square before inserting it into the outer tube. This forming operation may take place either before or after the inner tube is surrounded by the screen.

Likewise, when the outer tube is to be square in section, a round tube may be initially manufactured, and then formed to be approximately square in section before receiving the inner tube and the screen therein.

In order to give either the inner tube or the outer tube a square cross section, either approximately or exactly, the method described in the Applicants' French patent application No. 79 08760 is recommended. This method makes use of radial expansion and plastic deformation to obtain the square section, while leaving the outside face of the tube free.

The inner and outer tubes are preferably steel tubes of any selected composition and size. For example, the tube walls may be made of stainless steel sheet which is 1.5 mm to 4 mm thick.

A container made in accordance with the invention is suitable for transport and most particularly for storage since it may be placed in the immediate proximity of other identical containers, thereby ensuring maximum packing density in any given volume.

BRIEF DESCRIPTION OF THE DRAWING

An implementation of the invention is described by way of example with reference to the accompanying drawing, in which:

FIG. 1 is a longitudinal section through two end portions of a container made in accordance with the invention; and FIG. 2 is a set of cross sections through the container during different stages of the manufacturing method.

MORE DETAILED DESCRIPTION

FIG. 1 is a diagram showing an inner tube 1 around which a sheet of neutron-absorbing material 2 is wound and held in place by a strip 3 whose ends 3a and 3b are fixed, e.g. by welding, to the tube 1. The assembly obtained in this manner is received in an outer tube 6. FIG. 2 is a set of cross section diagrams (A) to (F) showing the steps of the method. The method begins (A) with a round tube 1 around which the sheet 2 is wrapped (B) so that its edges overlap. The sheet 2 is bound onto the tube 1 by the strip 3 and the ends of the strip are welded to the tube. This assembly then receives (C) an expander device comprising a support core 4 and radial punches 5 suitable for expanding the tube 1 until it is approximately square in section (D). The now square inner tube 1 together with its wrapping and the expander device are then inserted into the outer tube 6 which has also been shaped to be approximately square in section. The two-tube assembly is then expanded again to obtain the final assembly (F).

The expander device may be of the type described in French patent application Nos. 79 08760 and 80 16102.

The invention is applicable to containers for containing any kind of radioactive material, depending on the kind of screen material used. It is intended, in particular, for nuclear fuel containers of the type commonly stored in cells or pools in which the containers are placed side-by-side with as little wasted space as possible between containers.

If the nature of the fluid which comes into contact with the screen is likely to damage the screen, the ends of the inner and outer tubes may be interconnected, e.g. by welding, so as to seal off the intermediate screen-containing space.

We claim:

1. A method of manufacturing a double-wall container including a neutron-absorbing screen for enclosing radioactive material, the method comprising the steps of:
   providing an inner tube and an outer tube of suitable shape and size for the inner tube to be received coaxially inside the outer tube, thereby causing the outside face of the inner tube to face the inside face of the outer tube;
   fixing said neutron-absorbing screen to one of said faces;
   inserting the inner tube into the outer tube; and
   radially expanding the inner tube into the outer tube while leaving the outer tube externally free to expand, thereby plastically deforming both tubes and obtaining a solid single block assembly of desired shape and size for the container.

2. A method according to claim 1, wherein said screen is fixed on the outside face of the inner tube.

3. A method according to claim 2, wherein said screen is fixed to the inner tube by local or general adherence.

4. A method according to claim 2, wherein said screen is fixed to the inner tube by being bound by a strip whose ends are welded to the inner tube.

5. A method according to claim 1, wherein said screen is fixed to the inside face of the outer tube prior to the inner tube being inserted therein.

6. A method according to claim 1, wherein the screen-carrying tube is subjected to a preliminary cross-section shaping operation prior to the inner tube being inserted in the outer tube.

7. A method according to claim 1, wherein the inner tube is initially of round cross section and is shaped by radial expansion to be approximately square in cross section prior to being inserted in the outer tube.

8. A method according to claim 1, wherein the outer tube is initially round in cross section and is shaped by radial expansion to be approximately square in cross section prior to the inner tube being inserted therein.

9. A method according to claim 1, further including a step of interconnecting the ends of the tubes to seal off the screen-containing space between the tubes.

10. The method of claim 1 wherein the neutron-absorbing sheet is between 0.10 and 1 mm thick.

11. The method of claim 10 wherein the neutron-absorbing sheet is between 0.4 to 0.9 mm thick.

12. The method according to claim 10 wherein the neutron-absorbing sheet is between 0.5 to 0.8 mm thick.

* * * * *